Jan. 22, 1935.   E. A. SPERRY, JR., ET AL   1,988,521
GYRO EARTH INDUCTOR COMPASS
Original Filed March 28, 1930
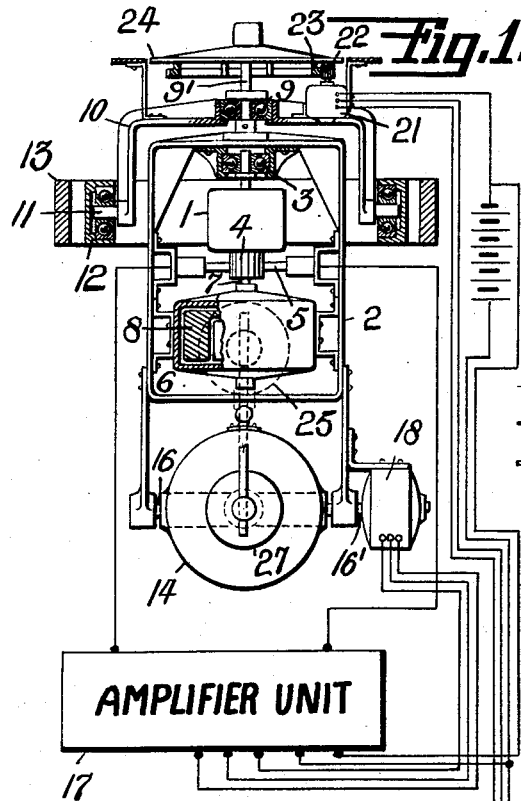
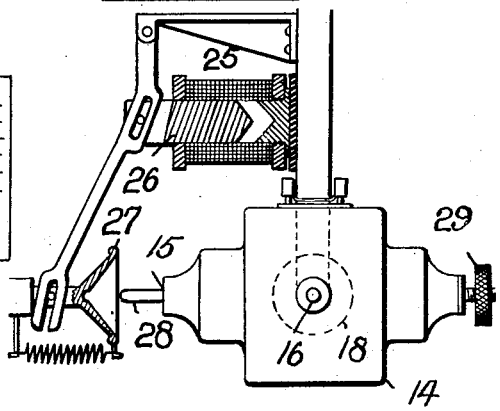
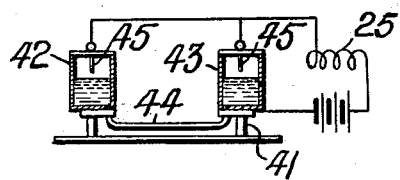
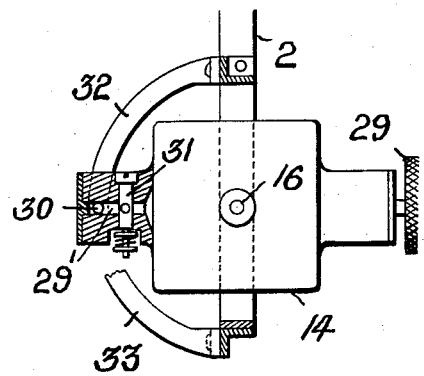
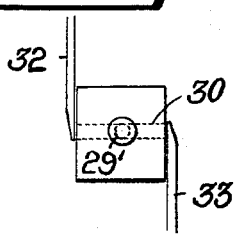
INVENTORS
ELMER A. SPERRY, JR.
BRUNO A. WITTKUHNS.
BY
ATTORNEY Patented Jan. 22, 1935

1,988,521

UNITED STATES PATENT OFFICE 1,988,521

GYRO EARTH INDUCTOR COMPASS

Elmer A. Sperry, Jr., Brooklyn, N. Y., and Bruno A. Wittkuhns, Chatham, N. J., assignors to Sperry Gyroscope Company, Inc., Brooklyn, N. Y., a corporation of New York Application March 28, 1930, Serial No. 439,614
Renewed October 11, 1933

11 Claims. (Cl. 33—204)

This invention relates to compasses. In the past, compasses have been divided into two types, magnetic and gyroscopic, and the magnetic compasses in turn have been of the magnetic needle type and of the earth inductor type. The present invention, however, relates to a combination of the magnetic and gyroscopic compasses which operates as a unitary instrument and in which endeavor is made to retain the advantages of both instruments and at the same time construct a device which is light enough and cheap enough for airplane use. While the present earth inductor device is termed a compass, it is really not a compass in that it does not indicate the points of the compass but is merely used to show deviations of the craft from a set course. It is hence really a course indicator and not a compass. In our invention, on the other hand, we construct an earth inductor device which operates as a compass by combining with the same one or more gyroscopes in a novel manner. To this end we mount the earth inductor device and gyroscope in a common frame which is free to turn about the vertical axis and we provide a torque-applying device on the gyroscope which is controlled by the output of the earth inductor compass. Stated in broader terms, we mount a means responsive to the earth's magnetic field (a form of magnetic compass) and a directional or free gyroscope in a common frame and correct the position of the gyroscope and its frame upon displacement of the gyroscope from its correct position with respect to the earth's magnetic field. By applying a torque about the horizontal axis of the gyroscope when the compass deviates from the meridian, the common frame of the gyroscope and compass is maintained in the meridian and hence the device constitutes a true compass on which a compass card may be mounted. By using the gyroscope also enough directive power is secured to operate directly or indirectly a repeater system whereby repeater compasses may be used which are placed near the pilot so that the earth inductor gyro instrument may be placed well away from the magnetic field of the engine. The gyroscope may hence be said to act as a servomotor for the earth inductor, supplying the necessary power for orienting the main frame.

Referring to the drawing in which several forms of the invention are shown,

Fig. 1 is a front elevation, partly in section, of my gyro-magnetic compass together with the connected instruments shown in diagrammatic form.

Fig. 2 is a side elevation, partly in section, of the gyro unit only.

Fig. 3 is a detailed sectional view of the level device for preventing the gyroscope from becoming inclined at too great an angle.

Fig. 4 is a similar view of a modified form of gyroscope having an air blast arrangement for limiting the inclination thereof.

Fig. 5 is a detailed view of the air blast arrangement of Fig. 4.

As is now well understood, the earth inductor direction indicator usually consists of an electrical armature revolved at high speed in the horizontal component of the earth's magnetic field. The armature, therefore, spins on a vertical spinning axis and has no poles, or at least no wound poles. The current generated by the rotation of the armature is usually led to a zero reader indicator and the brushes are adjusted in azimuth so that the indicator reads zero. In our device, on the other hand, we have shown the electrical armature 1 as mounted for rotation within a frame 2, the armature being journaled at the top in anti-friction bearing 3. The armature is provided with any suitable form of collector device, such as the commutator 4, and with brushes 5, which in this instance are fixed to the frame 2. The armature may be spun by any suitable means. For this purpose there is shown a polyphase motor 6, the armature of which is mounted on the shaft 7 of the earth inductor armature 1. Preferably the motor has incorporated therein a flywheel 8 so that it also acts as a gyroscope to stabilize the frame 2 about its horizontal axes of support. The frame 2 is shown as rotatably mounted about a vertical axis as by being suspended from an anti-friction bearing 9 in the spider 10, said spider in turn being pivotally mounted about horizontal axis 11 in the gimbal ring 12, said ring being pivotally mounted about an axis at right angles to axis 11 within a fixed ring 13.

Also mounted in said frame is a gyroscope 14. Said gyroscope is preferably mounted on a normally horizontal spinning axis 15 within the casing, the casing in turn being pivotally mounted about the horizontal axis 16 within the frame 2. The gyroscope, therefore, is free to turn about both horizontal axis 16 and about the vertical axis of and with the frame 2.

We also provide a means for exerting torques in both directions about the horizontal axis of the gyroscope controlled by the output of the earth inductor compass. As shown, the output of the earth inductor compass is led through a suitable amplifier unit 17, which is preferably of the thermionic tube type, to the torque applying device or motor 18 on the horizontal shaft 16' supporting the gyro casing. Said amplifying unit may be of any suitable form but since such units are well known and the specific construction forms no part of this invention it is illustrated only in diagrammatic form.

The position of the frame 2 in azimuth may be transmitted to a distance by providing one or more repeater compasses 19—19', which may be located in any convenient position on the airship. Said repeater compasses are actuated from any suitable form of repeater motor 20, which motors are actuated from a suitable transmitter 21. Said transmitter may be driven directly from the frame 2 as by having a pinion 22 thereon which meshes with a gear 23 secured to the under face of the compass card 24, which in turn is mounted on the shaft 9' of the frame 2. It is also obvious that the transmitter may be driven through any suitable type of follow-up device if it is desired to relieve the frame 2 and the gyro 14 of this load.

Means are also preferably provided to prevent the gyroscope from becoming inclined at such an angle that it loses its effectiveness. For this purpose we have shown in Figs. 2 and 3 a means for centralizing or caging the gyroscope in case it becomes inclined more than a predetermined amount. As shown, there is mounted on the gyroscope a pendulous or liquid level device 41 which may comprise a pair of liquid containers 42—43 connected by small bore tube 44, and containing mercury. Said receptacles are provided with contacts 45 with which the mercury contacts when the device becomes inclined more than a predetermined amount. This closes a circuit through the solenoid 25 which when excited attracts the armature 26 and throws the cup-shaped cage 27 into engagement with a projection 28 on the gyro casing, thus centralizing or leveling the gyroscope. An adjustable latitude weight 29 is also shown on the gyroscope.

An alternative means for leveling the gyroscope is shown in Figs. 4 and 5. According to this form of the invention, one end of the gyro casing is provided with an axial bore 29' which merges into a transverse bore 30 extending across the casing. A shut-off valve 31 may be provided within the bore 29' if desired. The rotation of a wheel creates an air pressure in the casing so that air will blow out equally through the open ends of the bore 30 if the same are both left uncovered. At each open end of said bore, however, we provide a shield or blade 32—33, one of which 32 extends downwardly and the other upwardly. Said shields are preferably secured to a normally vertical member, the frame 2 or vertical ring being employed for this purpose, blade 32 extending downwardly from frame 2 and blade 33 upwardly. Preferably when the gyro is horizontal, both ends of the bore 30 are closed so that no air escapes and no torque is exerted on the gyroscope. When, however, the gyro becomes inclined more than a predetermined amount, one of the openings is uncovered, resulting in a reaction on the gyroscope about the vertical axis in the proper direction to cause precession about the horizontal to bring the gyroscope approximately level again without disturbing its position in azimuth.

The operation of my gyro-magnetic compass is as follows: Assuming the device to be on the magnetic meridian, the brushes 5 will then lie substantially east and west, and if due allowance is made for lag and distortion, as in positioning the brushes of an electric motor, no E. M. F. will be generated and no torque exerted on the gyroscope. If, however, deviation occurs to the west (for instance) an E. M. F. will be generated in one direction, which is amplified in unit 17, and causes a torque on the gyroscope about its horizontal axis in the proper direction to bring the frame 2 back to the meridian. A similar but opposite effect will occur if deviation occurs to the east. The device, therefore, will indicate the true magnetic meridian. It will also be free of the sluggish opertion and centrifugal oscillatory effect usually present in magnetic compasses and will be as steady as a small gyroscopic compass would be of the same size. This is not only due to the well known resistance of gyroscopes to applied torques but also to the fact that the torque is small so that the gyroscope remains substantially unaffected by discontinuous or alternating torques and only responds to a continuous torque in the same direction. Also, since the gyroscope is non-pendulous and has three degrees of freedom, it will not be subject to the usual errors and troubles of the gyroscopic compass, due to the acceleration forces of rolling, pitching, turning and changes of speed.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A gyro-magnetic compass comprising a frame mounted for rotation about a vertical axis, an earth inductor device and a gyroscope mounted therein, and means controlled by said device for applying a torque on the gyroscope to cause the same to turn said frame about said vertical axis.

2. A gyro-magnetic compass comprising a frame mounted for rotation about a vertical axis, an earth inductor device and a gyroscope mounted therein, the latter for oscillation about a horizontal axis, and electro-magnetic means controlled by the output of said device for exerting a torque on said gyroscope about said horizontal axis to cause turning of said frame about said vertical axis to keep the compass in the meridian.

3. A gyro-magnetic compass comprising a frame mounted for rotation about a vertical axis, an earth inductor device and a gyroscope mounted therein, the latter for oscillation about a horizontal axis, electro-magnetic means controlled by the output of said device for exerting a torque on said gyroscope about said horizontal axis to cause turning of said frame about said vertical axis to keep the compass in the meridian, means for centralizing said gyroscope about said horizontal axis, and means controlled by the inclination of said gyroscope about its horizontal axis for controlling said centralizing means.

4. A gyro-magnetic compass comprising a frame mounted for rotation about a vertical axis, an earth inductor device and a gyroscope mounted therein, the latter for oscillation about a horizontal axis, electro-magnetic means controlled by the output of said device for exerting a torque on said gyroscope about said horizontal axis to cause turning of said frame about said vertical axis to keep the compass in the meridian, said torque means and gyroscope constituting power means adapted to apply a torque about the axis of said frame, and means controlled by the inclination of said gyroscope about its horizontal axis for maintaining said axis in a substantially horizontal position.

5. A gyro magnetic compass comprising a frame mounted for rotation about a vertical axis, an earth inductor armature mounted for rotation therein, spinning means therefor, a gyro rotor also spun from said means for stabilizing said frame, a second gyroscope mounted in said frame for oscillation about a horizontal axis, and means controlled by the output of said armature for applying a torque on said second gyroscope to cause turning of said frame toward the meridian.

6. In an earth inductor compass, the combination with the armature rotatable in the earth's magnetic field and an angularly adjustable support for the brushes thereof, of a servo-motor for turning said support and brushes to a predetermined position with respect to the magnetic pole including a gyroscope mounted on said support, and means controlled by the output of said armature for applying torques on the gyroscope to cause turning of said support.

7. A gyro-magnetic compass comprising a frame mounted for rotation about a vertical axis, an earth inductor device and a gyroscope mounted therein, means controlled by said device for applying a torque on the gyroscope to cause the same to turn said frame about said vertical axis, and means for preventing said gyroscope from assuming an inoperative position.

8. A gyro-magnetic compass comprising a frame mounted for rotation about a vertical axis, an earth inductor device and a gyroscope mounted therein, electrical means for applying a torque on the gyroscope to cause said gyroscope to turn said frame in azimuth, said means being controlled by the output of the inductor and a compass card on said frame whereby the device may be directly read as a compass.

9. In an earth inductor compass, a frame mounted for turning about a vertical axis, an armature rotatable therein in horizontal component of the earth's magnetic field, and means controlled by the output of said armature for orienting said frame including a gyroscope mounted in said frame for oscillation about a horizontal axis, an amplifying device in circuit with said armature, a torque device in circuit with said device for applying torques about said horizontal axis of the gyroscope and transmitting means turned by said frame to transmit compass readings to a distance.

10. A gyro magnetic compass comprising a frame mounted for rotation about a vertical axis, means responsive to the earth's magnetic field and a gyroscope mounted in said frame, and means responsive to displacement of said first responsive means from its correct position in the earth's magnetic field for applying a torque about the horizontal axis of the gyroscope to cause the same to turn the frame about said vertical axis to restore said frame and responsive means to a fixed relation to the earth's magnetic field.

11. A gyro magnetic compass comprising a frame mounted for rotation about a vertical axis, means responsive to the earth's magnetic field and a gyroscope mounted in said frame, means responsive to displacement of said first responsive means from its correct position in the earth's magnetic field for applying a torque about the horizontal axis of the gyroscope to cause the same to turn the frame about said vertical axis, and means responsive to tilt of the gyroscope for applying a torque about its vertical axis for preventing it assuming a large inclination.

ELMER A. SPERRY, Jr.
BRUNO A. WITTKUHNS.